(No Model.)

J. E. PREST.
CLUTCH FOR CARDING MACHINES.

No. 449,087. Patented Mar. 24, 1891.

WITNESSES:
Chas. H. Luther Jr.
M. F. Bligh.

INVENTOR:
John E. Prest
By Joseph A. Miller & Co.
Attys.

UNITED STATES PATENT OFFICE.

JOHN E. PREST, OF WHITINSVILLE, MASSACHUSETTS, ASSIGNOR TO THE WHITIN MACHINE WORKS, OF SAME PLACE.

CLUTCH FOR CARDING-MACHINES.

SPECIFICATION forming part of Letters Patent No. 449,087, dated March 24, 1891.

Application filed July 23, 1890. Serial No. 359,579. (No model.)

*To all whom it may concern:*

Be it known that I, JOHN E. PREST, of Whitinsville, in the county of Worcester and State of Massachusetts, have invented a new and useful Improvement in Clutches for Carding-Machines; and I hereby declare that the following is a full, clear, and exact description of the same, reference being had to the accompanying drawings, forming part of this specification.

This invention has reference to an improved shipper device for connecting and disconnecting the calender-roll shaft and the driving-gears; and it consists in the peculiar and novel construction of the clutch-gear and weighted shipper-arm, as will be more fully set forth hereinafter.

Figure 1:
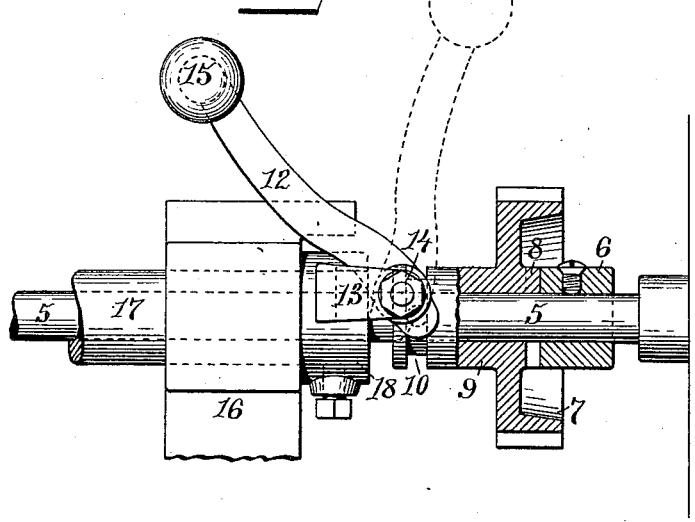
Figure 2:
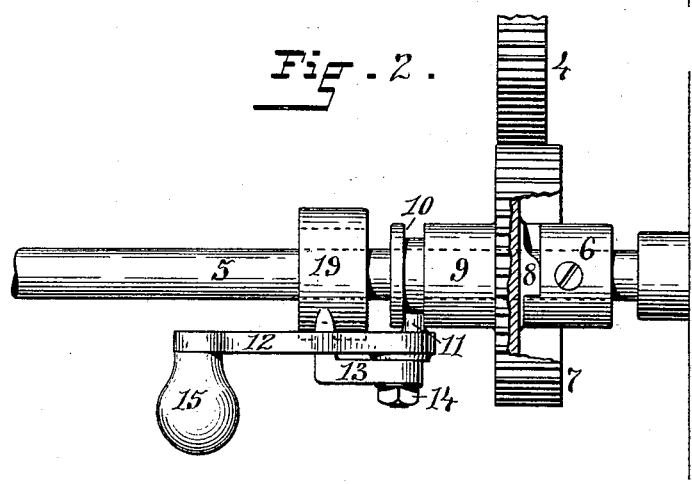
Figure 3:
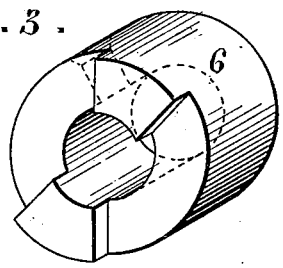

Figure 1 is a side view, partly in section, showing the position of the operating-arm in solid lines when the shaft is connected with the gear and in broken lines when disconnected. Fig. 2 is a top view partly in section, and Fig. 3 is an isometric view of the clutch secured to the calender-roll shaft.

Similar numbers of reference indicate corresponding parts in all the drawings.

In the drawings, the number 5 indicates the calender-roll shaft; 6, the clutch-sleeve permanently secured to the calender-roll shaft. 7 indicates the gear, mounted loosely on the shaft 5 and provided with the clutch-tooth 8, which engages with the clutch-sleeve 6. The gear 7 is provided with the sleeve 9, having the groove 10, into which the pin 11 enters. The gear 7 meshes with the gear 4. One or both of these gears are of sufficient width or length of tooth to permit the gear 7 to slide on the shaft 5 sufficiently to disconnect the clutch without disconnecting the gears, so that the gear may be made to revolve on the shaft or with the same, and thus the calender-roll may be stopped or started at will.

The pin 11 projects from the lower end of the lever 12, which lever is pivotally secured in the arm 13 by the nut 14. The lever 12 is provided at its outer end with the weight 15, which also forms a convenient handle for operating the lever. The weight 15 also holds by gravity the lever 12 in the positions indicated in Fig. 1, and thereby holds the gear on the shaft in both the coupled and uncoupled positions.

Two methods of supporting the arm 13 are indicated in the drawings.

In Fig. 1 the number 16 indicates part of the frame of a carding-machine in which the sleeve 17 is secured, forming the bearing for the shaft 5. To one end of this sleeve 17 the collar 18, from which the arm 13 projects, is secured, and thus forms a firm support for the pivoted lever.

In Fig. 2 the number 19 indicates a bearing for the shaft 5, from which the arm 13 projects. This bearing 19 may be a bracket secured to the frame of the carding-machine or part of the frame.

The calender-roll may be quickly started or stopped by moving the lever 12 from one position to the other, and thereby either sliding the gear 7 into contact with or away from the clutch-sleeve 6. The gear 7 always meshes with the gear 4, and is held against displacement in either the locked or unlocked position by the weight 15.

Having thus described my invention, I claim as new and desire to secure by Letters Patent—

1. In a clutch for a carding-machine, the combination, with the shaft of the calender-roll and the clutch-sleeve 6, rigidly secured thereto, of the gear 7, provided with the clutch-tooth 8, the sleeve 9, revolving independently of the shaft 5 and having the groove 10, and the lever 12, pivotally secured to the arm 13, provided with the pin 11 and weight 15, constructed to slide the gear into and out of engagement with the clutch mechanism and hold the same in either position, as described.

2. The combination, with the support 16, the sleeve-bearing 17, the shaft 5, and the clutch-sleeve 6, rigidly secured to said shaft, of the gear 7, having the clutch-tooth 8, the sleeve 9, having the groove 10, independently rotatable on the shaft 5, the collar 18, provided with the arm 13 and adapted to be secured to the sleeve, and the weighted lever 12, pivoted on the arm 13 and provided with the pin 11, constructed to connect or disconnect the calender-roll of a carding-machine with or from the driving mechanism, as described.

JOHN E. PREST.

Witnesses:
ARTHUR A. SIMMONS,
CHESTER W. LASELL.